June 19, 1956 — O. V. REIDENBACH — 2,750,646
CERAMIC COLUMN TEXTURING MACHINES
Filed March 27, 1952 — 3 Sheets-Sheet 1

INVENTOR.
Oscar V. Reidenbach
BY Frease & Bishop
ATTORNEYS

June 19, 1956     O. V. REIDENBACH     2,750,646
CERAMIC COLUMN TEXTURING MACHINES Filed March 27, 1952     3 Sheets-Sheet 2

INVENTOR.
Oscar V. Reidenbach
BY
Frease & Bishop
ATTORNEYS

June 19, 1956  O. V. REIDENBACH  2,750,646
CERAMIC COLUMN TEXTURING MACHINES
Filed March 27, 1952  3 Sheets-Sheet 3
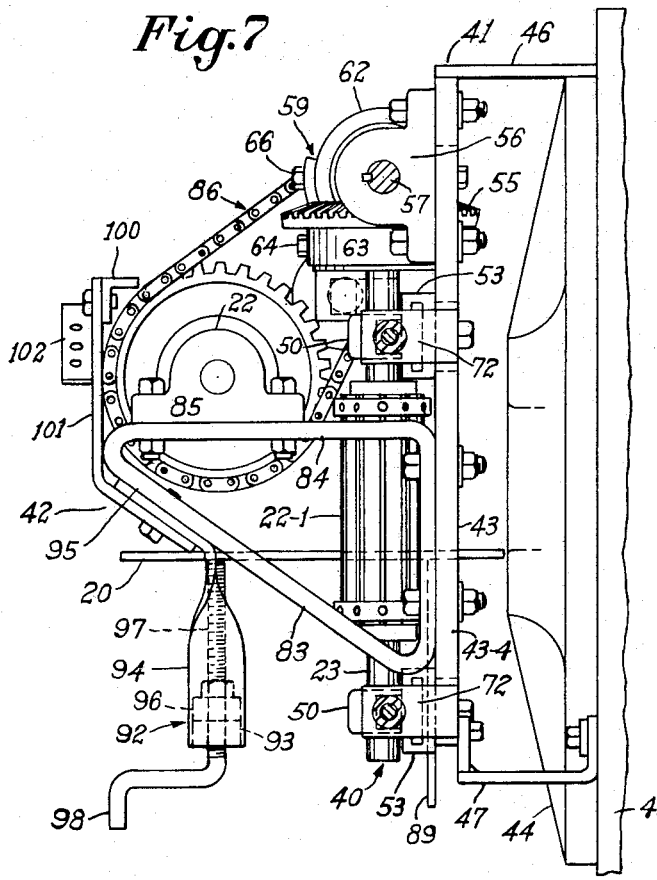
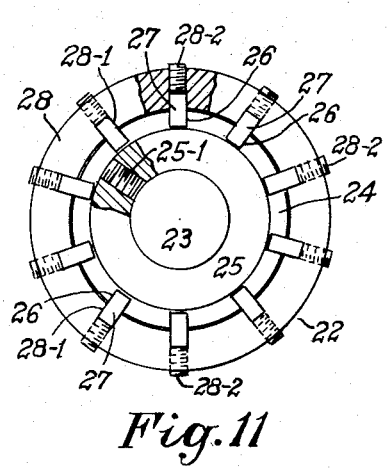
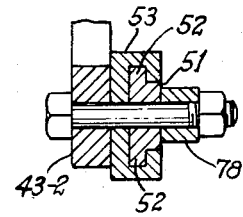
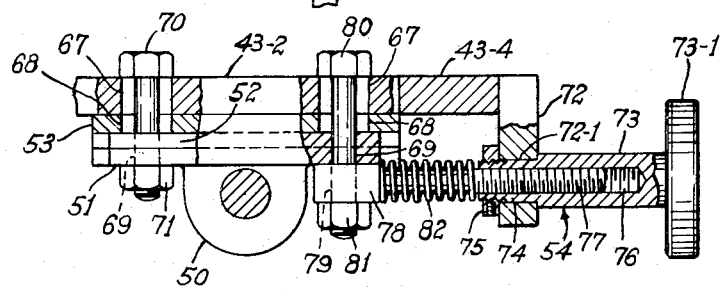
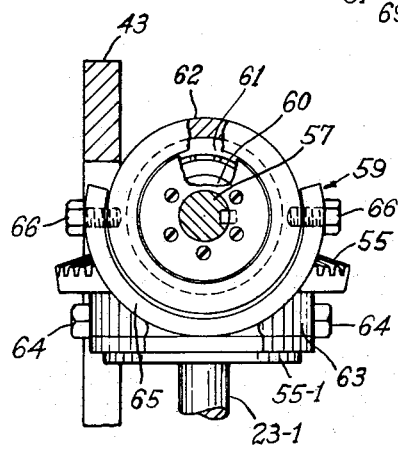
INVENTOR.
Oscar V. Reidenbach
BY
Frease & Bishop
ATTORNEYS United States Patent Office 2,750,646
Patented June 19, 1956

2,750,646

CERAMIC COLUMN TEXTURING MACHINES

Oscar V. Reidenbach, Baltic, Ohio, assignor to The General Clay Products Company, Columbus, Ohio, a corporation of Ohio Application March 27, 1952, Serial No. 278,901

10 Claims. (Cl. 25—1)

The invention or discovery relates to ceramic column texturing machines for use in the manufacture of textured ceramic products such as brick and the like. In my copending application for United States Letters Patent, Serial No. 277,355, filed March 19, 1952, there is disclosed an improved textured brick product and improved methods of making the same.

The improved textured brick product may be stated in general terms as constituting a fired brick product having one or more surfaces formed with integral transverse protuberant irregular ridges having blunt faces at one side and sloping top faces.

The improved method may be stated in general terms as including the steps of forming a composite roller having spaced radially and longitudinally extending metal bars and segments of green ceramic material between the bars, rotating the composite roller, and pressing and rubbing or slipping the roller against a surface of a green column of ceramic material, the column moving in opposition to the direction of rotation of the composite roller, and the surface speed of the composite roller being greater than the surface speed of the green column of ceramic material.

From a broader standpoint, any green body of ceramic material may have a surface textured by pressing and slipping an independently rotated composite roller against the surface, even if the body is stationary.

From the standpoint of making textured brick, it is desirable that the top and sides of a moving green column of ceramic material be simultaneously textured as the column emerges from the die of a brick machine, so that the front faces and end faces of the brick subsequently produced from wire cut sections of the column shall each have a textured surface as above described.

Texturing each of three faces of a green column of ceramic material requires a careful adjustment of each of the three composite rollers necessary, so that each roller will produce a textured surface uniform with the others. Moreover, the moisture content of a green column of ceramic material varies as the column emerges from the die of a brick machine, so that the texture produced varies, and requires adjustment of the rollers.

It has been found desirable that a texturing machine including three composite rollers for producing the three textured surfaces on the green column of ceramic material shall have gearing connecting each roller to a common drive motor. With such mechanism, it has been necessary, in prior texturing machines for carrying out the improved texturing methods, to stop the machines to adjust the rollers.

Also in such prior texturing machines, difficulties have been encountered in the construction of the metal parts of the composite rollers, so that the segments of green ceramic material may be properly built up and maintained.

The objects of the present invention or discovery include the provision of an improved texturing machine including three composite rollers, each adapted to operate on a different face of a moving green column of ceramic material, and gearing connecting the rollers to a common drive motor, and in which means are provided for adjusting the position of each roller with respect to the column surface against which it operates, the adjusting means being operable during operation of the texturing machine.

Further objects of the present invention or discovery include the provision of an improved construction and arrangement of the composite rollers for such an improved texturing machine.

The foregoing and other objects are attained by the ceramic column texturing machine, composite rollers therefor, and other parts, combinations, and sub-combinations thereof, which comprise the present invention or discovery, and the nature of which is set forth in the following general statement, and preferred embodiments of which together with their mode of use are set forth in the following description, and which are particularly and distinctly pointed out and set forth in the appended claims forming part hereof.

The nature of the improved ceramic column texturing machine of the present invention or discovery may be stated in general terms as including a frame at the column receiving end of the machine. Two laterally spaced composite rollers each adapted for operating on a side surface of the column after the column passes through the frame are located intermediate the frame and the column discharging end of the machine and each side composite roller has an axis of rotation parallel to the axis of rotation of the other and with a plane of the frame. Each side composite roller includes a shaft extending from the opposite ends thereof, and journal box means journal each end of each side composite roller, and slide means slidably mount each journal box means on the frame. Screw means are arranged for sliding each journal box means on its slide mounting means and adjusting the location of each journal box means on the frame.

One end of each shaft is an upper end, and a bevel gear wheel is secured on the upper end of each shaft. Each bevel gear wheel has a lower cylindrical hub. A drive shaft is journalled on the frame above the upper ends of the side composite rollers and the gear wheels thereon, the axis of rotation of the drive shaft being perpendicular to the axes of rotation of the shafts of the side composite rollers. A bevel drive pinion for each bevel gear wheel is slidably keyed on the drive shaft and meshed with its associated gear wheel. Each bevel drive pinion has a cylindrical hub. Each bevel drive pinion is pivot link connected with its associated bevel gear wheel by an angled double yoke link including a lower yoke pivotally connected with a sleeve journalled on the bevel gear wheel hub and an upper yoke pivotally connected with a bearing housing mounting a ball bearing on the bevel pinion hub.

Spaced from the side composite rollers and adjacent the discharge end of the machine, a top composite roller has a shaft journalled on an extension of the frame. Gear and chain means drive connect the drive shaft with the top composite roller shaft.

Below the top composite roller and between the side composite rollers, a slide table is adjustably mounted for raising and lowering. The slide table is adapted to slidably support the green ceramic column passing through the improved texturing machine and adjust the top face of the column for texturing by the top composite roller.

Each improved composite roller includes a shaft, a tube fitted on and secured to the shaft, the tube having an external cylindrical surface. A plurality of outwardly opening grooves are formed in the tube and open through its external surface. The grooves are parallel with each other and with the shaft. Each groove mounts a longitudinally extending bar which also extends radially outwardly from the external surface of the tube a distance equal to the radial extension of the other bars. At each end of the tube a retaining ring having inwardly opening radial notches fits over the tube and each notch fits over one end of each bar. Set screw means in each retaining ring clamp each bar against the tube.

By way of example, embodiments of the improved textured brick made by the improved methods carried out by the improved ceramic texturing machine of the present invention or discovery, views of steps of the improved methods, and embodiments of the improved ceramic column texturing machine and the improved composite rollers are illustrated in the accompanying drawings forming part hereof, in which:

Fig. 7 is a side elevational view thereof, looking in the direction of the arrows 7—7, and with parts shown in section on line 7—7;

Fig. 8 is an enlarged fragmentary vertical sectional view thereof, as on line 8—8, Fig. 6;

Fig. 9 is an enlarged fragmentary horizontal sectional view thereof, as on line 9—9, Fig. 6, and with portions broken away and shown in section;

Fig. 10 is an enlarged fragmentary vertical sectional view thereof, as on line 10—10, Fig. 6, and with portions broken away and shown in section; and Fig. 11 is an end elevational view of one of the improved composite rollers detached from the machine, portions being broken away and shown in section.

Similar numerals refer to similar parts throughout the drawings.

Figure 1:
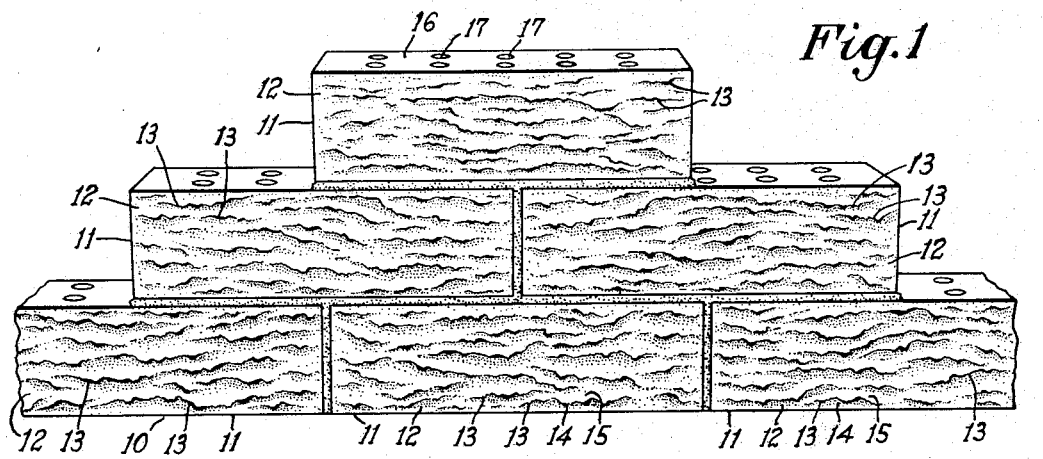
Fig. 1 is a fragmentary perspective view showing a portion of a wall laid up of a number of the improved textured brick.

In Fig. 1 there is shown a portion 10 of a wall laid up of a number of the improved fired textured brick, each brick being indicated by 11, and each brick 11 having an improved textured front face or surface 12 having a length narrower than its height, as is usual in face brick. Preferably the end faces not shown on each brick 11 is also formed with the improved textured surface.

Each improved textured front face or surface 12 is formed by a plurality of protuberant irregular ridges, each indicated by 13. Each ridge 13 has a blunt face 14 at one side and a sloping top face 15.

Each brick 11 has a usual smooth top face 16 perpendicular to the general plane of its front face 12, and usual cylindrical holes 17, parallel to the general plane of the front face 12, may be open through the top face 16.

Each texture ridge 13 extends longitudinally of the rectangular front face 12 of the brick on which the ridge is formed. Since the smooth top face 16 of each brick 11 and the opposite parallel bottom face are usually initially formed by transversely wire cutting a green column of ceramic material, each ridge 13 may be more broadly described as extending transversely of the brick as a whole, since each ridge 13 extends generally in the same direction as the transverse top face 16 and opposite transverse bottom face of the brick 11.

In the fired brick 11, and at all stages after its initial formation, each ridge 13 is integral with the body of the brick 11, and each integral ridge textured front face 12 and the similar textured end faces of the fired brick 11 may be further described as being rough and rugged and non-marring in handling and laying and use.

Each integral ridge textured front face 12 and the similar textured end faces are initially formed on a green column of ceramic material by the improved methods which are hereinafter described in detail. The improved textured brick and the improved methods are set forth and claimed in my co-pending application for United States Letters Patent, Serial No. 277,355, filed March 19, 1952. The description thereof contained herein is included to enable proper understanding of the improved ceramic column texturing machine hereof.

Figure 2:
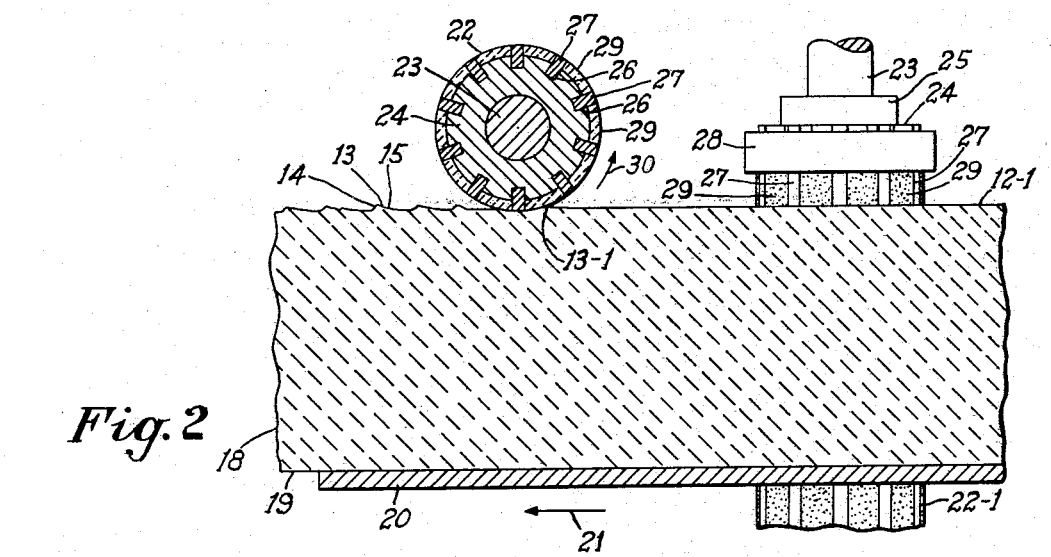
Fig. 2 is a fragmentary schematic part sectional and part elevational view showing a green ceramic column as it is extruded from a brick machine and two composite rollers each operating on a different surface of the column and producing improved texture ridges by the improved methods.
Figure 3:
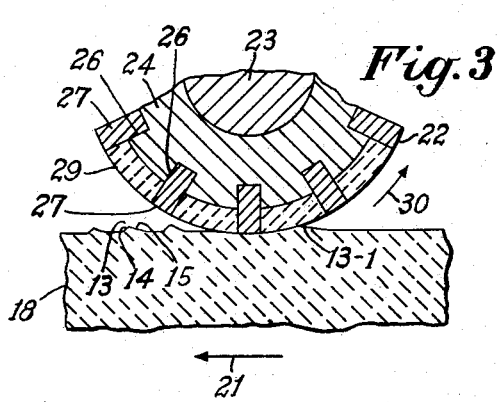
Fig. 3 is an enlarged fragmentary view of portions of Fig. 2.
Figure 4:
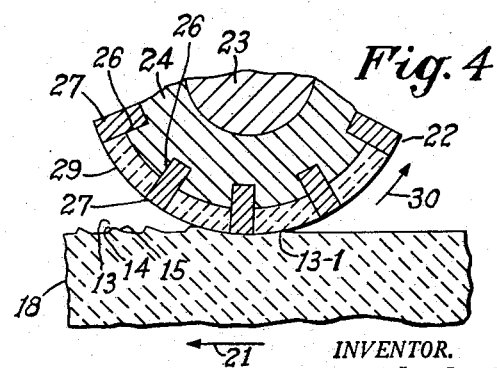
Fig. 4 is a view similar to Fig. 3 showing the green ceramic column in a more advanced position.

Steps of the improved methods for making the improved textured brick are shown schematically in Figs. 2, 3, and 4. In Fig. 2 there is shown in longitudinal vertical section a fragment or portion of a green column 18 of ceramic material after emerging from the extrusion die of a usual brick machine not shown. The ceramic material of the green column 18 may be clay, a mixture of clay and shale, or other desired mixture of ceramic ingredients. For convenience hereinafter the green column of ceramic material will be referred to as a "clay column," and in addition to its ceramic ingredients, the clay column has a varying moisture content as it emerges from the extrusion die of the brick machine.

The clay column 18 has a smooth bottom face 19 which slides over and is supported by the top face of a table plate 20. On emerging from the extrusion die of the brick machine, the clay column 18 has a smooth top face 12–1 and similar smooth side faces which become the front and end faces, respectively of the brick formed from the clay column.

The clay column 18 is shown as moving in the direction of the arrow 21. The top face 12–1 of the column 18 is operated on by the top composite roller 22 shown in transverse cross-section, and the two opposite side faces of the column 18, are each operated on by a composite roller 22–1, one of which is shown in fragmentary elevation in Fig. 2.

The construction and method of making each composite roller 22 and 22–1 is substantially the same, and each includes a shaft 23 on which is secured a fitting tube 24 having at each end a reduced neck 25. In the cylindrical outer surface of the tube 24, there are formed a plurality of grooves 26 which are parallel with each other and the shaft 23. In each groove 26 there is fitted a bar 27 extending radially outwardly from the cylindrical outer surface of the tube 24.

All the bars extend the same distance radially outwardly from the cylindrical outer surface of the tube 24, and the grooves 26 and thus the bars 27 are spaced from each other equally in angular measure with respect to the longitudinal center axis of rotation of the shaft 23. In other words, the bars 27 are equally spaced circumferentially of the cylindrical outer surface of the tube 24.

At each end of the tube 24, a retaining ring 28 fits over the bars 27, and preferably set screw means clamp each ring 28 to each bar 27, and thus each bar 27 in its slot 26 to the tube 24. The set screw means are further described in detail hereinafter.

The shaft 23, tube 24, bars 27, and retaining rings 28 are made of metal preferably steel. Between each adjacent pair of bars 27 and the end rings 28, there is formed a segmental space which becomes filled with a clay segment 29 from the clay column 18 in carrying out the improved method.

Each composite roller 22 and 22–1, thus includes alternate external bars and segments equally spaced circumferentially of the cylindrical external surface of the roller, and the bars being made of rigid material such as metal, and the segments being made of plastic material such as clay.

The composite roller 22 rotates in a direction indicated by the arrow 30 opposed to the direction of movement of the clay column 18 indicated by the arrow 21. The rollers 22-1 are likewise rotated in directions opposed to the direction of movement of the clay column.

The surface speed of the clay column 18 may be from substantially 30 F. P. M. to substantially 50 F. P. M. The surface speed of the rollers 22 and 22-1 is substantially double the surface speed of the clay column, so that when the clay column surface speed is 30 F. P. M., the roller surface speed in 60 F. P. M. There is thus an opposed differential surface speed of the rollers with respect to the clay column of 90 F. P. M.

For any particular run of the clay column 18, the segmental spaces between the bars 27 and end rings 28 of the rollers 22 and 22-1 are initially empty. The rollers are adjusted so that the outer faces of the bars 27 slide or rub into the opposed face of the clay column 18, when the rollers are rotated, and movement of the clay column takes place. This rubbing action is accompanied by a slight slicing action on the surfaces of the clay column 18, which soon causes a building up of the clay segments 29 in each composite roller.

After the building up of the clay segments 29 in the composite rollers 22 and 22-1, the action of these composite rollers on the opposed faces of the clay column 18 is substantially rubbing and pressing and slipping with drag.

On an advancing face of the clay column 18 there is rolled up or dragged a ridge 13-1 from the portion of the advancing face already beneath the composite roller 22 or 22-1, as shown in Figs. 2 and 3.

Since the surface speed of each roller is substantially twice the surface speed of the clay column, a number of bars 27 and clay segments 29 pass over each initially formed ridge 13-1, which is more or less symmetrical in cross-section, and extends transversely of the clay column.

Each initially formed ridge 13-1 is rolled down to form a ridge 13 on the advancing face of the clay column 18 as it leaves the roller, which advancing face becomes for example a textured face 12 from the smooth face 12-1, as shown in Figs. 2, 3 and 4.

Each of the ridges 13 on the clay column 18, in its initial form 13-1 and its final form 13, is integral with the body of the clay column, and remains so in the subsequent manufacturing steps. Each ridge 13 on the clay column 18 is unsymmetrical in cross-section and has a blunt side 14 and a sloping top face 15, the general arrangement of which remains the same in the fired brick 11.

After texturing the clay column 18, the subsequent manufacturing steps include the usual steps of wire cutting the green brick from the column, drying the green brick, and firing the dried brick.

It has ben noted in carrying out the improved method, that the rubbing and dragging of the external surfaces of the clay segments 29 on opposed faces of the clay column 18 produce textured surfaces which tend to be independent of the moisture content of the clay column, since the segment clay of the rollers is the same as the clay of the column. On the other hand, if the texturing implement is entirely of different material than the column clay, variations in the moisture content of the column clay produce marked variations in the texture.

The adjective "green" as herein used, has its common meaning in the ceramic industry, that is it signifies that the body of ceramic material which is described as a "green ceramic column," or a "green brick" has a moisture content. While it is usually initially formed in some manner, a "green ceramic body" has not been dried or fired.

The embodiments of the improved ceramic column texturing machine of the present invention or discovery illustrated in Figs. 5 to 10, inclusive, is particularly adapted to carry out the improved method in an improved manner and apply the improved texturing to a green ceramic column as it emerges from the die of a brick machine.

Figure 5:
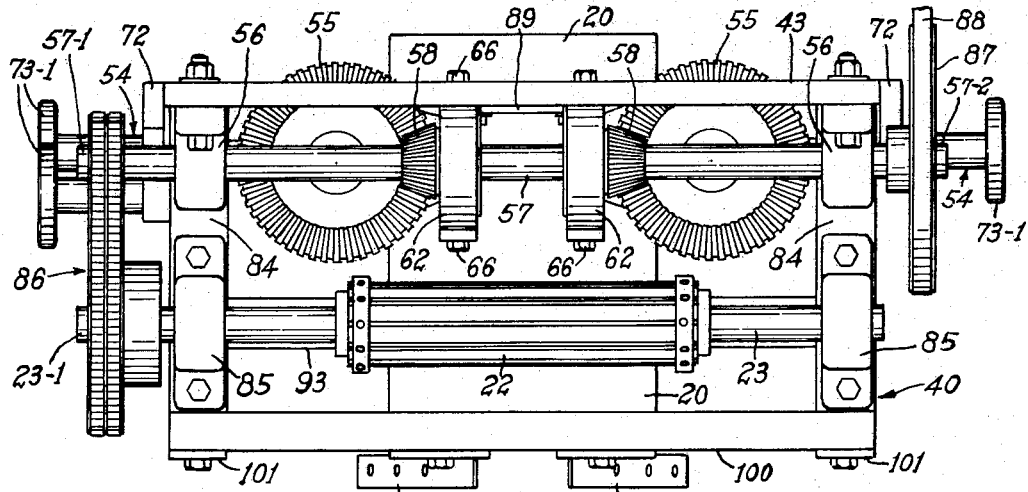
Fig. 5 is a top plan view of the improved ceramic column texturing machine hereof.
Figure 6:
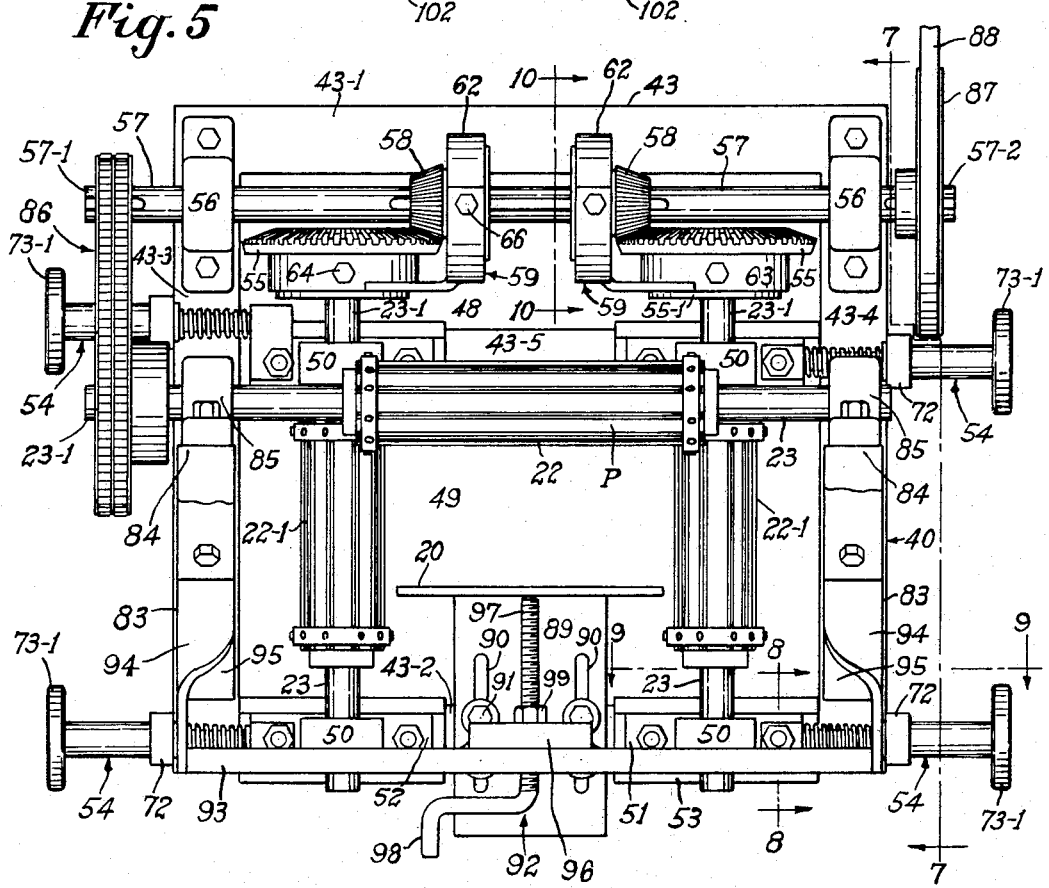
Fig. 6 is a front elevational view thereof, looking towards the column discharging end of the machine, portions being broken away.

The improved ceramic column texturing machine is indicated generally by 40 in Figs. 5, 6, and 7, and has a column receiving end 41 and a column discharging end 42. A rectangular frame 43 is located at the column receiving end of the machine, and is preferably of one-piece construction, and may be made by flame cutting a steel plate. The frame 43 extends vertically and horizontally in use, and as shown in Fig. 7 the frame 43 in use is spaced in front of the extrusion die 44 at the column discharge end 45 of a brick machine not otherwise shown. Upper brackets 46 and lower brackets 47 connect an support the frame 43 to and on the discharge end of the brick machine.

As best shown in Fig. 6, the rectangular frame 43 includes parallel top and bottom beam members 43-1 and 43-2 connecting at their ends with the ends of parallel side strut members 43-3 and 43-4. An intermediate beam member 43-5 is parallel with and spaced between the top and bottom beam members 43-1 and 43-2, and the intermediate beam member 43-5 connects at its ends with the side strut members 43-3 and 43-4. The frame 43 thus encloses an upper rectangular opening 48 and a lower rectangular opening 49. The green ceramic column passes through the lower frame opening 49 as the column emerges from the brick machine extrusion die 44.

Two laterally spaced composite rollers 22-1, each adapted to operate on a side surface of the green ceramic column after it passes through the frame opening 49, are located intermediate the frame 43 and the column discharging end 42 of the machine 40. Each side composite roller 22-1 has an axis of rotation parallel to the axis of rotation of the other and with the plane of the flat front face of the frame 43.

Each side composite roller 22-1 includes a shaft 23 extending from the opposite ends thereof, and each end of each shaft 23 is journalled in a journal box 50 having a slide base 51 provided with outwardly extending side flanges 52 which slide in inwardly opening fitting grooves of a guide member 53, each of the guide members 53 being secured as by welding to one of the beam members 43-2 or 43-5 of the frame 43.

Means are provided for clamping each slide base 51 at any desired position of adjustment in its guide member, as is described in detail hereinafter. Screw means, each indicated generally by 54, are provided for sliding each journal box base 51 in its guide member 53 for push and pull adjusting the location of the journal box 50 mounted thereon. One of the screw means 54 is described in detail hereinafter.

Each shaft 23 has an upper end 23-1 extending above the intermediate beam member 43-5 and the upper journal box 50 thereon. On the extremity of each shaft upper end 23-1, there is secured a bevel gear wheel 55 which has a lower hub that is journalled in a ball bearing mounted in a housing 55-1.

Journal boxes 56, one secured on each upper corner of the frame 43, journal a drive shaft 57 which extends above the gear wheels 55, the axis of rotation of the drive shaft 57 being perpendicular to the axis of rotation of the shaft 23 of the side composite rollers 22-1. Two bevel drive pinions 58 are slidably keyed on the drive shaft 57 with their teeth extending away from each other, the teeth of each drive pinion being meshed with the teeth of one of the bevel gear wheels 55.

Pivot link means, each indicated generally by 59, connect each bevel drive pinion 58 with its associated bevel gear wheel 55. Each bevel drive pinion has a cylindrical hub 60 as shown in Fig. 10. A ball bearing 61 has an inner race ring fitting on the hub 60 and an outer race ring fitting in a cylindrical flanged housing 62. The pivot link means 59 includes an angled double yoke link including a lower yoke 63 pivotally connected by diametrically opposite pivot screws 64 with the bevel gear wheel bearing housing 55–1. The double yoke link also includes an upper yoke 65 pivotally connected by diametrically opposite pivot screws 66 with the bevel pinion bearing housing 62.

Figs. 8 and 9 show details of the slide base clamping means and the screw adjusting means 54 for the slide base 51 at the lower right corner of Fig. 6. As above stated the slide member 53 is secured as by welding to the bottom beam member 43–2 of the frame 43. A set of registering slots 67 and 68 are formed respectively in the beam member 43–2 and in the bottom wall of the guide member 53 at each side of the journal box 50. The slide base 51 has a bore 69 formed therein at each side of the journal box, one of the bores 69 being aligned with one of the sets of slots 67 and 68. A clamp bolt 70 has its head abutting the inner face of the beam member 43–2 and its shank extending through the registering slots 67 and 68 and the aligned bore 69. The threaded outer end of the shank of bolt 70 extends beyond the outer face of the slide base 51, and a nut 71 is screwed on the threaded outer end of bolt 70.

For the push and pull screw adjusting means 54, a journal block 72 has its rear end secured as by welding to the frame side member 43–4, and a bearing bore 72–1 is formed in the front end of the block 72. A rotatable sleeve nut 73 has a reduced journal end 74 journalled in the bearing bore 72–1. The journal end 74 extends beyond the inner side face of the block 72 and is externally threaded. A shoulder nut 75 is screwed on the threaded journal end 74 and is secured thereon by a set screw so as to permit rotation of the sleeve 73. In the internally threaded bore 76 of the sleeve nut 73, there is screwed the outer end of an adjusting screw 77 having a bored connecting head 78 seated on top of the slide base 51 on the outer side of the journal box 50. The connecting head bore 79 is aligned with the outer bore 69 of slide base 51. A clamp and connecting bolt 80 has its head abutting the inner face of the beam member 43–2 and its shank extending through the registering slots 67 and 68 and aligned bores 69 and 79. The threaded outer end of the shank of bolt 80 extends beyond the outer face of the adjusting screw connecting head 78, and a nut 81 is screwed on the threaded outer end of bolt 80.

Between the adjusting screw head 78 and the opposite shoulder nut 75, there is interposed a helical compression spring 82, the screw 77 extending through the coils of the spring 82.

On each side strut member 43–3 and 43–4 there is bolted one of the leg bars of a right triangular bar bracket 83 having an upper horizontal leg bar 84. A journal box 85 is bolted on each leg bar 84. The journal boxes 85 are spaced from and in front of the side composite rollers 22–1. A top composite roller 22 has a shaft 23 with laterally extending ends each of which is journalled in one of the journal boxes 85. The top composite roller shaft 23 has a horizontal axis of rotation.

The top composite roller 22 is located by the journal boxes 85 in front of the side composite rollers 22–1, and the top composite roller 22 has an effective rolling length greater than the distance between the side composite rollers 22–1.

The ends 57–1 and 23–1, respectively, of the shafts 57 and 23 journalled in the journal boxes 56 and 85, respectively mounted on the frame side strut member 43–3, extend beyond these journal boxes, and gear and chain means indicated generally by 86 drive connect the drive shaft 57 with top composite roller shaft 23.

The end 57–2 of the drive shaft 57 extends beyond the journal box 56 mounted at the upper end of frame side strut member 43–4, and a V pulley wheel 87 is keyed on the drive shaft end 57–2. A V belt 88 connects the pulley wheel with a drive pulley on the shaft of a drive motor, not shown.

A horizontal slide table plate 20 is located between the side rollers 22–1 and below the top roller 22. Means adjustably mount the table plate 20 on the frame 43, for positioning the table plate at a selected elevation with respect to the top roller 22. As shown, the adjustable mounting means include a plate strut 89 depending from the table plate 20. The plate strut 89 has formed therein a pair of laterally spaced vertical slots 90. Shanks of two bolts 91 extend through each slot 90 and the bolts 91 clamp the plate strut 89 to the frame bottom beam member 43–2.

Screw elevator means indicated generally by 92 are provided for raising and lowering the table plate 20. As shown the screw elevator means 92 includes a bridge bar 93 spaced in front of the frame bottom beam member 43–2. The bridge bar 93 is suspended at each end by a strap 94 from the hypotenuse bar 95 of one of the triangular bar brackets 83. A nut block 96 is secured centrally on the top face of the bridge bar 93 which has a bore formed therein registering with the internally threaded bore of the nut block 96. A crank screw has a screw shank 97 screwed upwardly through the nut block 96, the upper end face of the shank 97 abutting against the lower face of the table plate 20. The lower end of the screw shank 97 extends below the bridge bar 93 and is bent to form a crank handle 98. A lock nut 99 is screwed on the screw shank 97 above the nut block.

In the improved texturing machine 40, there is also provided a horizontal angle bridge bar 100 located in front of and above the top rollers 22 and supported at each end by a post 101 connected at its lower end with the front end of one of the triangular bar brackets 83. Two spaced blade holders 102 are adjustably mounted on the angle bridge bar 100. Each blade holder 102 is adapted to mount a blade for scraping the top corners of a textured green ceramic column discharged from the machine 40.

Fig. 11 is an end elevational view of one of the improved composite rollers, which may be the top roller 22, including the shaft 23 on which is secured the fitting tube 24 having at each end a reduced neck 25. A set screw 25–1 is screwed in a threaded radial bore in each neck 25 for securing the tube 24 on the shaft 23.

In the cylindrical outer surface of the tube 24, there are formed a plurality of grooves 26 which are parallel with each other and with the shaft 23. In each groove 26 there is fitted a longitudinally extending bar 27 which also extends radially outwardly from the cylindrical outer surface of the tube 24.

All the bars extend the same distance radially outwardly from the cylindrical outer surface of the tube 24. The grooves 26 and thus the bars 27 are spaced from each other equally in angular measure about the longitudinal center axis of rotation of the shaft 23. In other words, the bars 27 are equally spaced circumferentially of the cylindrical outer surface of the tube 24.

At each end of the tube 24, a retaining ring 28, having inwardly opening notches 28–1 formed in its inner periphery, fits over the tube 24 and the bars 27, each notch 28–1 being spaced and sized to fit one of the bars. In radial alignment with each notch 28–1, there is formed in the retaining ring 28 a threaded bore in which is screwed a set screw 28–2. The set screws 28–2, reacting against the ring 28, clamp the bars 27 in their grooves 26 against the tube 24.

The shaft 23, tube 24, bars 27, and retaining rings 28 are made of metal, preferably steel. Between each pair of bars 27 and the end rings 28, there is formed a segmental space or pocket P. These parts taken as a whole may be termed a composite roller pocketed component, which as shown is made of separate rigid metal parts. This composite roller pocketed component may however be machined out of a solid piece of metal, or be cast of metal, or molded of material such as hard rubber or molding plastics.

In any case the segmental pockets P become filled with clay segments 29 from the clay column 18 in carrying out the improved method.

Referring to the improved texturing machine 40 as a whole, each adjusting sleeve nut 73 is provided with an outer knob handle 73–1 by which it may be manually turned. In setting up the machine 40 and in subsequent adjustments, the nuts 71 and 81 are relieved of clamping pressure. The knob handles 73–1 are then manipulated to locate the journal boxes 50 to position the side rollers 22–1 at desired locations. This positioning may be done while a green ceramic column is passing between the rollers so as to obtain the exact texture desired, and to maintain this texture substantially on each side of the column even if the moisture content of the green ceramic column changes. After adjustment, the clamp nuts 71 and 81 are tightened.

Similarly, release of the clamp bolts 91 permit operation of the elevator means 92, to adjust the level of the table plate 20 for obtaining proper texturing action of the top composite roller 22. The clamp bolts 91 are then tightened.

In the foregoing description, certain terms have been used for brevity, clearness, and understanding, but no unnecessary limitations are to be implied therefrom beyond the requirements of the prior art, because such words are used for descriptive purposes herein and are intended to be broadly construed.

Moreover, the embodiments of the improved constructions illustrated and described herein are by way of example, and the scope of the present invention or discovery is not limited to the exact details of construction set forth.

Having now described the invention or discovery, the construction, the operation, and use of preferred embodiments thereof, and the advantageous new and useful results obtained thereby; the new and useful constructions and reasonable mechanical equivalents thereof obvious to those skilled in the art, are set forth in the appended claims.

I claim:

1. In a ceramic column texturing machine having a column receiving end and a column discharging end, a frame at the column receiving end of the machine, the frame including members enclosing a column pass-through opening, two laterally spaced side texturing rollers located intermediate the frame and the column discharging end of the machine, each side texturing roller being adapted to operate on a side surface of a green ceramic column passing between the side texturing rollers, each side texturing roller having an axis of rotation parallel to the axis of rotation of the other and with a plane of the frame, each side texturing roller including a shaft having ends extending from the opposite ends thereof, a journal box journalling each end of each shaft, each journal box having a slide base, a guide member slidably mounting each slide base, each guide member being secured on one of the frame members, means for releasably clamping each journal box slide base at a selected location of adjustment on its guide member, screw means for sliding each journal box base on its guide member for adjusting the location of the base and journal box thereon and the texturing roller shaft end journalled in the journal box, and common drive means for the side texturing roller shafts, the common drive means including a drive shaft extending cross-wise of the side texturing roller shafts, a driven gear secured on each roller shaft, a drive gear slidably keyed on the drive shaft for each driven gear, each drive gear and its associated driven gear having teeth meshed with each other, a pivot link extending between each drive gear and its associated driven gear, each drive gear having a hub and a housing journalling the hub and each associated driven gear having a hub and housing journalling the hub, means pivotally connecting the link with the drive gear journal housing and means pivotally connecting the link with the driven gear journal housing.

2. In a ceramic column texturing machine having a column receiving end and a column discharging end, a frame at the column receiving end of the machine, the frame including members enclosing a column pass-through opening, two laterally spaced side texturing rollers located intermediate the frame and the column discharging end of the machine, each side texturing roller being adapted to operate on a side surface of a green ceramic column passing between the side texturing rollers, each side texturing roller having an axis of rotation parallel to the axis of rotation of the other and with a plane of the frame, each side texturing roller including a shaft having ends extending from the opposite ends thereof, a journal box journalling each end of each shaft, each journal box having a slide base, a guide member slidably mounting each slide base, each guide member being secured on one of the frame members, means for releasably clamping each journal box slide base at a selected location of adjustment on its guide member, screw means for sliding each journal box base on its guide member for adjusting the location of the base and journal box thereon and the texturing roller shaft end journalled in the journal box, and common drive means for the side texturing roller shafts, the common drive means including a drive shaft extending cross-wise of the side texturing roller shafts, a driven gear secured on each roller shaft, a drive gear slidably keyed on the drive shaft for each driven gear, each drive gear and its associated driven gear having teeth meshed with each other, a pivot link extending between each drive gear and its associated driven gear, each drive gear having a hub and a housing journalling the hub and each associated driven gear having a hub and a housing journalling the hub, means pivotally connecting the link with the drive gear journal housing and means pivotally connecting the link with the driven gear journal housing, the drive shaft being spaced from similar ends of the side texturing roller shafts, the axis of rotation of the drive shaft intersecting extensions of the axes of rotation of the roller shafts, and each driven gear being a bevel gear wheel and each drive gear being a bevel pinion.

3. In a ceramic column texturing machine, a frame including members enclosing a column pass-through opening, two laterally spaced side texturing rollers located adjacent the frame, each side texturing roller being adapted to operate on a side surface of a green ceramic column passing between the side texturing rollers, each side texturing roller having an axis of rotation parallel to the axis of rotation of the other and with a plane of the frame, each side texturing roller including a shaft having ends extending from the opposite ends thereof, a journal box journalling each end of each shaft, means slidably mounting each journal box on the frame, means releasably clamping each journal box on the frame, and common drive means for the side texturing roller shafts, the common drive means including a drive shaft extending cross-wise of the side texturing roller shafts, a driven gear secured on each roller shaft, a drive gear slidably keyed on the drive shaft for each driven gear, each drive gear and its associated driven gear having teeth meshed with each other, a pivot link extending between each drive gear and its associated driven gear, each drive gear having a hub and a housing journalling the hub and each associated driven gear having a hub and a housing journalling the hub, means pivotally connecting the link with the drive gear journal housing, and means pivotally connecting the link with the driven gear journal housing.

4. In a ceramic column texturing machine, a frame including members enclosing a column pass-through opening, two laterally spaced side texturing rollers located adjacent the frame, each side texturing roller being adapted to operate on a side surface of a green ceramic column passing between the side texturing rollers, each side texturing roller having an axis of rotation parallel to the axis of rotation of the other and with a plane of the frame, each side texturing roller including a shaft having ends extending from the opposite ends thereof, a journal box journalling each end of each shaft, means slidably mounting each journal box on the frame, means releasably clamping each journal box on the frame, and common drive means for the side texturing roller shafts, the common drive means including a drive shaft extending crosswise of the side texturing roller shafts, a driven gear secured on each roller shaft, a drive gear slidably keyed on the drive shaft for each driven gear, each drive gear and its associated driven gear having teeth meshed with each other, a pivot link extending between each drive gear and its associated driven gear, each drive gear having a hub and a housing journalling the hub and each associated driven gear having a hub and a housing journalling the hub, means pivotally connecting the link with the drive gear journal housing, and means pivotally connecting the link with the driven gear journal housing, the drive shaft being spaced from similar ends of the side texturing roller shafts, the axis of rotation of the drive shaft intersecting extensions of the axes of rotation of the roller shafts, and each driven gear being a bevel gear wheel and each drive gear being a bevel pinion.

5. Adjustable power transmission apparatus for a ceramic column texturing machine and the like, including members forming a frame, some of the frame members enclosing an opening having a center plane, two laterally spaced driven shafts on opposite sides of the center plane, each driven shaft having opposite ends, a journal box journalling each end of each driven shaft, means mounting each journal box on the frame for movement towards and away from the center plane, means releasably positioning each journal box on the frame, and common drive means for the driven shafts, the common drive means including a drive shaft extending cross-wise of the driven shafts, a driven gear secured on each driven shaft, a drive gear slidably keyed on the drive shaft for each driven gear, each drive gear and its associated driven gear having teeth meshed with each other, a pivot link extending between each drive gear and its associated driven gear, each drive gear having a hub and a housing journalling the hub and each associated driven gear having a hub and a housing journalling the hub, means pivotally connecting each link with its associated drive gear journal housing, and means pivotally connecting each link with its associated driven gear journal housing.

6. Adjustable power transmission apparatus for a ceramic column texturing machine and the like, including members forming a frame, some of the frame members enclosing an opening having a center plane, two laterally spaced driven shafts on opposite sides of the center plane, each driven shaft having opposite ends, a journal box journalling each end of each driven shaft, means mounting each journal box in the frame for movement towards and away from the center plane, means releasably positioning each journal box on the frame, and common drive means for the driven shafts, the common drive means including a drive shaft extending cross-wise of the driven shafts, a driven gear secured on each driven shaft, a drive gear slidably keyed on the drive shaft for each driven gear, each drive gear and its associated driven gear having teeth meshed with each other, a pivot link extending between each drive gear and its associated driven gear, each drive gear having a hub and a housing journalling the hub and each associated driven gear having a hub and a housing journalling the hub, means pivotally connecting each link with its associated drive gear journal housing, and means pivotally connecting each link with its associated driven gear journal housing, the drive shaft being spaced from similar ends of the driven shafts, the axis of rotation of the drive shaft intersecting extensions of the axes of rotation of the driven shafts, and each driven gear being a bevel gear wheel and each drive gear being a bevel pinion.

7. Adjustable power transmission apparatus for a ceramic column texturing machine and the like, including members forming a frame, some of the frame members enclosing an opening having a center plane, a driven shaft laterally spaced from the center plane, the driven shaft having opposite ends, a journal box journalling each end of the driven shaft, means mounting each journal box on the frame for movement towards and away from the center plane, means releasably positioning each journal box on the frame, a drive shaft extending crosswise of the driven shaft, a driven gear secured on the driven shaft, a drive gear slidably keyed on the drive shaft, the drive gear and the driven gear having teeth meshed with each other, a pivot link extending between the drive gear and the driven gear, the drive gear having a hub and a housing journalling the hub and the driven gear having a hub and a housing journalling the hub, means pivotally connecting the link with the drive gear journal housing, and means pivotally connecting the link with the driven gear journal housing.

8. Adjustable power transmission apparatus for a ceramic column texturing machine and the like, including members forming a frame, some of the frame members enclosing an opening having a center plane, a driven shaft laterally spaced from the center plane, the driven shaft having opposite ends, a journal box journalling each end of the driven shaft, means mounting each journal box on the frame for movement towards and away from the center plane, means releasably positioning each journal box on the frame, a drive shaft extending crosswise of the driven shaft, a driven gear secured on the driven shaft, a drive gear slidably keyed on the drive shaft, the drive gear and the driven gear having teeth meshed with each other, a pivot link extending between the drive gear and the driven gear, the drive gear having a hub and a housing journalling the hub and the driven gear having a hub and a housing journalling the hub, means pivotally connecting the link with the drive gear journal housing, and means pivotally connecting the link with the driven gear journal housing, the drive shaft being spaced from one end of the driven shaft, the axis of rotation of the drive shaft intersecting an extension of the axis of rotation of the driven shaft, and the driven gear being a bevel gear wheel and the drive gear being a bevel pinion.

9. Adjustable power transmission apparatus for a ceramic column texturing machine and the like, including members forming a frame, some of the frame members enclosing an opening having a center plane, a driven shaft laterally spaced from the center plane, the driven shaft having opposite ends, a journal box journalling each end of the driven shaft, means mounting each journal box on the frame for movement towards and away from the center plane, push and pull screw means positioning each journal box on the frame, a drive shaft extending cross-wise of the driven shaft, a driven gear secured on the driven shaft, a drive gear slidably keyed on the drive shaft, the drive gear and the driven gear having teeth meshed with each other, a pivot link extending between the drive gear and the driven gear, the drive gear having a hub and a housing journalling the hub and the driven gear having a hub and a housing journalling the hub, means pivotally connecting the link with the drive gear journal housing, and means pivotally connecting the link with the driven gear journal housing.

10. Adjustable power transmission apparatus for a ceramic column texturing machine and the like, including members forming a frame, some of the frame members enclosing an opening having a center plane, a driven shaft laterally spaced from the center plane, the driven shaft having opposite ends, a journal box journalling each end of the driven shaft, means mounting each journal box on the frame for movement towards and away from the center plane, push and pull screw means positioning each journal box on the frame, a drive shaft extending cross-wise of the driven shaft, a driven gear secured on the driven shaft, a drive gear slidably keyed on the drive shaft, the drive gear and the driven gear having teeth meshed with each other, a pivot link extending between the drive gear and the driven gear, the drive gear having a hub and a housing journalling the hub and the driven gear having a hub and a housing journalling the hub, means pivotally connecting the link with the drive gear journal housing, and means pivotally connecting the link with the driven gear journal housing, the drive shaft being spaced from one end of the driven shaft, the axis of rotation of the drive shaft intersecting an extension of the axis of rotation of the driven shaft, and the driven gear being a bevel gear wheel and the drive gear being a bevel pinion.

References Cited in the file of this patent

UNITED STATES PATENTS

| | | |
|---|---|---|
| 692,744 | Warstler | Feb. 4, 1902 |
| 801,408 | Smeed | Oct. 10, 1905 |
| 815,238 | Von Oven | Mar. 13, 1906 |
| 1,187,529 | Ireland | June 20, 1916 |
| 1,221,014 | Barnett | Apr. 3, 1917 |
| 2,245,058 | Skyrms | June 10, 1941 |